United States Patent
Okazaki et al.

(10) Patent No.: US 6,503,961 B1
(45) Date of Patent: Jan. 7, 2003

(54) ACTIVE ENERGY BEAM-CURABLE ADHESIVE COMPOSITION

(75) Inventors: Eiichi Okazaki; Ichiro Igarashi; Kunihiko Mizutani, all of Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 0 days.

(21) Appl. No.: 09/645,617

(22) Filed: Aug. 25, 2000

(30) Foreign Application Priority Data

Aug. 27, 1999 (JP) ............................................ 11-241163

(51) Int. Cl.$^7$ ................................................. C08F 2/46
(52) U.S. Cl. .................. 522/173; 522/174; 522/90; 522/96; 522/150; 522/151; 522/152; 522/167; 522/176
(58) Field of Search .................... 522/96, 167, 152, 522/90, 150, 151, 173, 174, 176

(56) References Cited

U.S. PATENT DOCUMENTS

| 4,266,005 A | * | 5/1981 | Nakamura et al. | 430/271 |
| 4,380,613 A | * | 4/1983 | Nativi | 525/440 |
| 5,021,487 A | * | 6/1991 | Klemarczyk | 524/104 |
| 5,162,087 A | * | 11/1992 | Fukuzawa et al. | 252/500 |
| 6,057,381 A | * | 5/2000 | Ma et al. | 522/99 |

FOREIGN PATENT DOCUMENTS

| EP | 0 457 499 A1 | 5/1991 |
| EP | 0 540 097 A1 | 5/1993 |
| JP | 10-36462 | 2/1998 |
| WO | WO 98/58912 | 12/1998 |

OTHER PUBLICATIONS

Database WPI, Week 9816, Derwent Publ. Ltd., AN 1998–174964, XP002182402, "Active Energy Ray Curing Compositions", & JP 10 036462 A.

Database WPI, Week 9938, Derwent Publ. Ltd., AN 1999–453059, XP002182403, "Resin Composition for Sticking Sheet", & JP 11 189762 A.

Database WPI, Week 8945, Derwent Publ. Ltd., AN 1989–327660, XP002182404, "New Imide Acrylate for Solder Resist Resin Composition", & JP 01 242569 A.

* cited by examiner

Primary Examiner—James J. Seidleck
Assistant Examiner—Sanza McClendon
(74) Attorney, Agent, or Firm—Fitch, Even, Tabin & Flannery

(57) ABSTRACT

An active energy beam-curable adhesive composition is provided. The adhesive composition comprises (A), (B), and if required, (C) components. The component (A) is urethane (meth)acrylate derived from polyester polyol or polycarbonate polyol. The component (B) is a compound having at least one ethylenically unsaturated group together with at least one a cyclic imide group represented by the following general formula (1) . Further, the component (C) is a compound having at least one ethylenically unsaturated group other than the components (A) and (B):

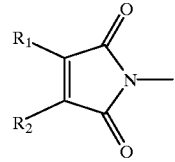

(1)

4 Claims, No Drawings

ACTIVE ENERGY BEAM-CURABLE ADHESIVE COMPOSITION

The present invention relates to an active energy beam-curable adhesive composition capable of bonding various base materials by irradiation with active energy beams such as electron beams and ultraviolet rays. The composition of the present invention is preferably used for bonding thin layer adherends such as plastic films or plastic sheets. Further, it is preferably used for manufacturing various optical films or sheets to be used in liquid crystal display elements and the like. Thus, it can advantageously be used in these technical fields.

Conventionally, in a laminating method in which bonding is achieved between thin layer adherends such as plastic films or sheets, or between a thin layer adherend such as a plastic film or sheet and another thin layer adherend made from a different material, there has been principally employed a dry laminating method in which a solvent type adhesive composition including an ethylene-vinyl acetate copolymer or a polyurethane polymer is coated on a first thin layer adherend, and dried, and a second thin layer adherend is then compression bonded thereto by means of a nip roller or the like.

The adhesive composition used in this method generally contains a large amount of solvent for uniforming the coated amount of the composition. For this reason, the solvent evaporates in large amounts during drying, presenting the problems of toxicity, working safety and environmental pollution. Further, the adhesive composition also causes a problem that peeling occurs between thin film adherends in a post-processing step conducted immediately after bonding the thin layer adherends together, such as in a heat sealing step for ensuring the bonding of the resulting laminated film, and in a ruling step for engraving grooves.

A solventless adhesive composition has been examined as an adhesive composition for solving these problems.

As a solventless adhesive composition, a two-part adhesive composition or an adhesive composition curable by active energy beams such as ultraviolet rays and electron beams has been widely used.

As a two-part adhesive composition, there has been prevalently used a so-called polyurethane adhesive composition including a polymer having a hydroxyl group at the terminal as a base agent, and a polyisocyanate compound having an isocyanate group at the terminal as a curing agent. However, the composition has a deficiency that too much time is required for curing. For this reason, there have occurred problems in terms of production such that the post-processing steps such as a ruling step cannot be started immediately after bonding the thin layer adherends.

In contrast, the active energy beam-curable adhesive composition is excellent in productivity because of its high curing speed, and hence has received attention in recent years.

On the other hand, liquid crystal display apparatuses have been widely used as display devices such as compact televisions, portable personal computers, portable telephones, and word processors, including simple display apparatuses in digital watches and various electric appliances as a matter of course. In recent years, the active energy beam-curable adhesive has also come into use in bonding of various optical films used in the liquid crystal display devices.

The adhesive composition to be used in the optical film has been required to have such a performance as to be capable of holding its adhesive force under extreme conditions of high temperatures and high humidities.

However, while most of conventional active energy beam-curable adhesives have been excellent in initial adhesive strength, they may show a reduction in adhesive strength after long-duration use under high temperature or high humidity conditions, resulting in peeling, or whitening due to moisture absorption.

The present inventors have already proposed a composition including urethane (meth)acrylate and imide (meth)acrylate with a specific structure as a composition applicable for various uses, including use as an adhesive (Japanese Laid-Open (Kokai) Patent Publication No. Hei 10-36462).

The composition has been more excellent in adhesion under high temperature and high humidity conditions as compared with conventional active energy beam-curable adhesive composition when used as an adhesive for manufacturing an optical film, but has not reached the practical level.

In view of the foregoing problems, the present inventors have intensively studied and it is therefore an object of the present invention to provide an active energy beam-curable adhesive composition excellent in adhesion under high temperature and high humidity conditions, and at a practicable level.

As a result of various studies, the present inventors have found that an active energy beam-curable adhesive composition which comprises a specific urethane (meth)acrylate and a compound having a specific cyclic imide group is excellent in adhesion under either condition of high temperature or high humidity and at a practicable level, and have completed the present invention.

Below, the present invention will be described in details.

It is noted that, in this specification, acrylate and/or methacrylate is referred to as (meth)acrylate, an acryloyl group and/or a methacryloyl group is referred to as a (meth)acryloyl group, and acrylic acid and/or methacrylic acid is referred to as (meth)acrylic acid.

1. (A) Urethane (meth)acrylate Derived from Polyester Polyol or Polycarbonate Polyol The component (A) in the present invention is urethane (meth)acrylate derived from polyester polyol or polycarbonate polyol. The urethane (meth)acrylate provides a particularly excellent adhesive strength under high humidities.

As the component (A), both of the oligomer and polymer are usable, and the one having a weight-average molecular weight of 500 to 30,000 is preferred. It is noted in the present invention that the weight-average molecular weight is defined as a polystyrene-converted value of the molecular weight determined by gel permeation chromatography.

Examples of urethane (meth)acrylate include a compound obtained by allowing the reaction product of polyester polyol or polycarbonate polyol and organic polyisocyanate to react with (meth)acrylate containing hydroxyl group.

Examples of polycarbonate polyol include the reaction product between low molecular weight polyol (described later), polyether polyol (described later) and/or bisphenol such as bisphenol A, and ethylene carbonate and carboxylic acid dialkyl ester such as carboxylic acid dibutyl ester. Examples of polyester polyol include the esterification reaction product between low molecular weight polyol (described later) and/or polyether polyol (described later) and each acid component of dibasic acid such as adipic acid, succinic acid, phthalic acid, tetrahydrophthalic acid, hexahydrophthalic acid, or terephtalic acid, or anhydrides thereof.

Here, examples of the low molecular weight polyol include ethylene glycol, propylene glycol, 1,6-hexanediol, cyclohexane dimethanol, and 3-methyl-1,5-pentanediol. Examples of polyether polyol include polyalkylene glycols such as polyethylene glycol, polypropylene glycol, and polytetramethylene glycol, and diol of a block or random-polymer such as polyethylene polypropoxy block polymer diol.

Examples of the organic polyisocyanate include tolylene diisocyanate, 1,6-hexane diisocyanate, 4,4'-diphenylmethane diisocyanate, polymethylene polyphenylisocyanate, 1,6-hexane diisocyanate trimer, hydrogenated tolylene diisocyanate, hydrogenated 4,4'-diphenylmethane diisocyanate, xylylene diisocyanate, hydrogenated xylylene diisocyanate, paraphenylene diisocyanate, tolylene diisocyanate dimer, 1,5-naphthalene diisocyanate, hexamethylene diisocyanate adduct, 4,4'-dicyclohexylmethane diisocyanate, trimethylolpropane tris (tolylene diisocyanate) adduct, and isophorone diisocyanate.

Examples of the hydroxyl group-containing (meth) acrylate include hydroxyalkyl (meth)acrylates such as 2-hydroxyethyl(meth)acrylate, 2-hydroxypropyl (meth) acrylate, hydroxybutyl (meth)acrylate, hydroxypentyl (meth)acrylate, hydroxyhexyl (meth)acrylate, hydroxyoctyl (meth)acrylate, pentaerythritol tri-, di-, or mono(meth) acrylate, and trimethylolpropane di- or mono(meth)acrylate.

These are obtained in the following manner. Namely, in the presence of an addition catalyst such as dibutyltin dilaurate, an organic isocyanate and a polyol component are heated under agitation to undergo an addition reaction. Further, hydroxyalkyl (meth)acrylate is added thereto to be heated under agitation, effecting the addition reaction.

In the present invention, if required, urethane poly(meth) acrylate other than those mentioned above can also be used in combination. Examples thereof include the compounds described on pages 70 to 74 of the "UV/EB Curable Material" published in 1992 by CMC Co., Ltd.

2. (B) Compound Having at Least One Ethylenically Unsaturated Group Together with at Least One Cyclic Imide Group The component (B) is a compound having at least one ethylenically unsaturated group together with at least one cyclic imide group represented by the following general formula (1):

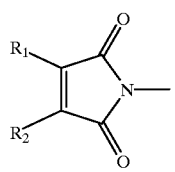

(1)

(where $R_1$ and $R_2$ are each independently a hydrogen atom or an alkyl group having 4 or less carbon atoms, or $R_1$ and $R_2$ represent an unsaturated or saturated hydrocarbon group of a 5- or 6-membered ring formed by linkage with each other.)

In the above formula (1), it is preferable that at least one of $R_1$ and $R_2$ is the alkyl group having 4 or less carbon atoms, and it is also preferable that $R_1$ and $R_2$ are the unsaturated or saturated hydrocarbon group of a 5- or 6-membered ring formed by linkage with each other. Specific examples thereof include —$CH_2CH_2CH_2$—, —CH=CHCH$_2$—, —$CH_2CH_2CH_2CH_2$—, —$CH_2$CH=CHCH$_2$—, or —CH=CHCH=CH— group.

As the component (B), the imide (meth)acrylate represented by the following general formula (2) is preferred in terms of ease of its manufacturing:

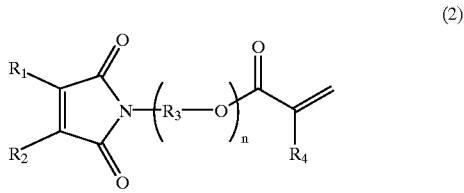

(2)

(where $R_1$ and $R_2$ are each independently a hydrogen atom or an alkyl group having 4 or less carbon atoms, or $R_1$ and $R_2$ represent an unsaturated or saturated hydrocarbon group of a 5- or 6-membered ring formed by linkage with each other; $R_3$ represents a straight-chain or branched alkylene group having 1 to 6 carbon atoms; $R_4$ represents a hydrogen atom or a methyl group; and n denotes an integer of 1 to 6.)

Out of the compounds represented by the general formula (2), the compounds represented by the following general formulae (3) to (5) are more preferred.

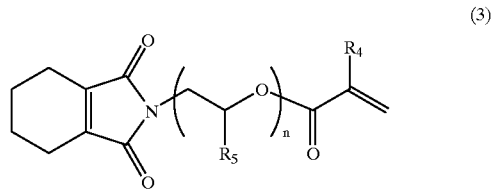

(3)

(where $R_4$ and $R_5$ each represents a hydrogen atom or a methyl group, and n denotes an integer of 1 to 6.)

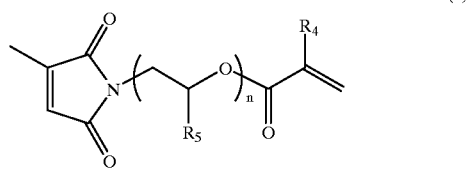

(4)

(where $R_4$ and $R_5$ each represents a hydrogen atom or a methyl group, and n denotes an integer of 1 to 6.)

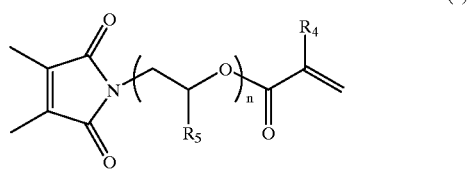

(5)

(where $R_4$ and $R_5$ each represents a hydrogen atom or a methyl group, and n denotes an integer of 1 to 6.)

The compound represented by the general formula (2) can be manufactured from an acid anhydride, amino alcohol, and unsaturated carboxylic acid by the methods described in the following documents including patent publications:

Kiyoshi Kato, et al., "Journal of Synthetic Organic Chemistry" 30(10), 897, (1972);

Javier de Abajo et al., "Polymer", vol. 33(5), (1992); and

Japanese Laid-Open (Kokai) Patent Publication No.Sho 56-53119, and Japanese Laid-Open (Kokai) Patent Publication No.Hei 1-242569.

3. (C) Compound Having at Least One Ethylenically Unsaturated Group

To the composition of the present invention, there can be added, if required, a compound having at least one ethylenically unsaturated group.

As the component (C), various compounds can be used so long as they are not the compounds (A) and (B). Examples of the component (C) include monomers, oligomers, and polymers.

The components (C) can be used in combination of two or more thereof.

3-1. Monomer

As the monomer, there can be mentioned a compound having one (meth)acryloyl group. Examples of the compound include ethyl (meth)acrylate, propyl (meth)acrylate, butyl (meth)acrylate, pentyl (meth)acrylate, hexyl (meth)acrylate, heptyl (meth)acrylate, and 2-ethylhexyl (meth)acrylate.

Further, in addition to (meth)acrylates, mention may be made of (meth)acrylamide derivatives such as N-methyl acrylamide, N-isopropyl acrylamide, N,N-dimethylaminopropyl acrylamide, N,N-dimethyl acrylamide, N-vinyl formamide, N-vinyl-N-methyl formamide, N-vinylacetoamide, N-vinyl-N-methylacetoamide, and acryloylmorpholine; and N-vinyl compounds such as N-vinylpyrrolidone and N-vinylcaprolactam.

Examples of a compound having two or more (meth)acryloyl groups include alkylene glycol di(meth)acrylates such as ethylene glycol di(meth)acrylate, tetraethylene glycol di(meth)acrylate, propylene glycol di(meth)acrylate, and tripropylene glycol di(meth)acrylate; glycol di(meth)acrylates such as 1,6-hexanediol di(meth)acrylate and neopentyl glycol di(meth)acrylate; bisphenol type di(meth)acrylates such as bisphenol A di(meth)acrylate or halogen-nucleus-substituted products thereof, and bisphenol F di(meth)acrylate or halogen-nucleus-substituted products thereof; polyol poly(meth)acrylates such as dimethylol tricyclodecane di(meth)acrylate, trimethylolpropane tri(meth)acrylate, ditrimethylolpropane tetra(meth)acrylate, pentaerythritol tri(meth)acrylate, pentaerythritol tetra(meth)acrylate, and dipentaerythritol hexa(meth)acrylate; poly(meth)acrylates of alkylene oxide adducts of the polyols; and di-, or tri(meth)acrylates of isocyanuric acid alkylene oxide.

In addition to these compounds, there can be mentioned the compounds as described on pages 53 to 56 of "The Latest UV-Curable Technology" published in 1991 by Printing Information Association Co., Ltd., and the like.

3-2. Oligomer

Examples of oligomer include polyester (meth)acrylate, epoxy (meth)acrylate, and polyether (meth)acrylate.

3-2-1. Polyester (meth)acrylate Oligomer

Examples of polyester (meth)acrylate oligomer include dehydrated condensates of polyester polyol and (meth)acrylic acid.

Here, as polyester polyol, there may be mentioned the reaction products of polyol, and carboxylic acid or anhydride thereof. Examples of polyol include low molecular weight polyols such as ethylene glycol, diethylene glycol, triethylene glycol, tetraethylene glycol, polyethylene glycol, propylene glycol, dipropylene glycol, tripropylene glycol, polypropylene glycol, butylene glycol, polybutylene glycol, hexamethylene glycol, neopentyl glycol, cyclohexane dimethanol, 3-methyl-1,5-pentanediol, 1,6-hexanediol, trimethylolpropane, glycerin, pentaerythritol, and dipentaerythritol, and alkylene oxide adducts thereof.

Examples of carboxylic acid or anhydride thereof include dibasic acids such as orthophthalic acid, isophthalic acid, terephthalic acid, adipic acid, succinic acid, fumaric acid, maleic acid, hexahydrophthalic acid, tetrahydrophthalic acid, and trimellitic acid, and anhydrides thereof.

As polyester poly(meth)acrylates other than these compounds, there can be mentioned the compounds as described on pages 74 to 76 of the aforesaid literature "UV/EB-Curable Material", and the like.

3-2-2. Epoxy (meth)acrylate Oligomer

Epoxy (meth)acrylate is a compound obtained from the addition reaction of epoxy resin and (meth)acrylic acid. Examples thereof include the compounds as described on pages 74 to 75 of the aforesaid literature "UV/EB-Curable Material", and the like.

Examples of epoxy resin include aromatic epoxy resins and aliphatic epoxy resins.

Specific examples of aromatic epoxy resins include resorcinol diglycidyl ether; di-, or polyglycidyl ethers of bisphenol A, bisphenol F, bisphenol S, bisphenol fluorene, or alkylene oxide adducts thereof; novolac epoxy resins such as phenolic novolac epoxy resins and cresol novolac epoxy resins; glycidyl phthalimide; and o-phthalic acid diglycidyl ester. In addition to these compounds, there can be mentioned the compounds as described in chapter 2 of "Epoxy Resin-Recent Advance-" published in 1990 by Shokoudo, and on pages 4 to 6 and 9 to 16 of "Polymer Processing" extra issue 9 of vol.22 on epoxy resins (published in 1973 by Polymer Publication Society).

Specific examples of aliphatic epoxy resins include diglycidyl ethers of alkylene glycols such as ethylene glycol, propylene glycol, 1,4-butanediol, and 1,6-hexanediol; diglycidyl ether of polyalkylene glycol such as polyethylene glycol and polypropylene glycol; diglycidyl ethers of neopentyl glycol, dibromoneopenyl glycol, and alkylene oxide adducts thereof; polyglycidyl ethers of polyhydric alcohols such as di-, or triglycidyl ethers of trimethylolethane, trimethylolpropane, glycerin, and alkylene oxide adducts thereof, and di-, tri-, or tetraglycidyl ethers of pentaerythritol and alkylene oxide adducts thereof; di-, or polyglycidyl ethers of hydrogenated bisphenol A and alkylene oxide adducts thereof; tetrahydrophthalic acid diglycidyl ether; and hydroquinone diglycidyl ether. In addition to these compounds, there can be mentioned the compounds described on pages 3 to 6 of the aforesaid literature "Polymer Processing" extra issue on epoxy resin.

Other than these aromatic epoxy resins and aliphatic epoxy resins, there can be mentioned an epoxy compound having a triazine nucleus in the structure, such as TEPIC (trade name: Nissan Chemical Industries Co., Ltd.), or Denacol EX-310 (trade name: Nagase Kasei Co., Ltd.) Further, there can also be mentioned the compounds as described on pages 289 to 296 of the aforesaid literature "Polymer Processing" extra issue on epoxy resin.

In the foregoing compounds, the alkylene oxides for use in alkylene oxide adducts are preferably ethylene oxide, propylene oxide, and the like.

3-2-3. Polyether (meth)acrylate Oligomer

Examples of polyether (meth)acrylate oligomer include polyalkylene glycol di(meth)acrylates such as polyethylene glycol di(meth)acrylate, polypropylene glycol di(meth)acrylate, and polytetramethylene glycol di(meth)acrylate.

3-3. Polymer

As the polymer, there can be mentioned (meth)acrylic polymers having (meth)acryloyloxy groups and those obtained by introducing (meth)acryloyl groups into the side chains of a (meth)acrylic polymer having functional groups, e.g., the compounds as described on pages 78 to 79 of the aforesaid literature "UV/EB Curing Material".

4. Mixing Ratio

In the present invention, the ratio of the components (A), (B), and (C) is preferably the component (A) 5 to 50% by weight; the component (B) 10 to 95% by weight; and the component (C) 0 to 85% by weight.

When the ratio of the component (A) is less than 5% by weight, the adhesive force under high temperatures on the adherend may be reduced. On the other hand, when it is more than 50% by weight, the initial adhesive force or the adhesive force under high humidities on the adherend may be reduced.

When the ratio of the component (B) is less than 10% by weight, the adhesive strength under high temperatures or high humidities on the adherend may be reduced. On the other hand, when it is more than 95% by weight, the adhesive strength under high temperatures on the adherend may be reduced.

When the ratio of the component (C) is more than 85% by weight, the initial adhesive force and the adhesive force under high temperatures or high humidities on the adherend may be reduced.

5. Other Components

When the composition of the present invention is cured by ultraviolet rays, if required, a photopolymerization initiator may also be mixed therein.

Examples of the photopolymerization initiator include benzonins and alkyl ethers thereof such as benzoin, benzoin methyl ether, benzoin ethyl ether, and benzoin isopropyl ether; acetophenones such as acetophenone, 2,2-dimethoxy-2-phenylacetophenone, 2,2-diethoxy-2-phenylacetophenone, 1,1-dichloroacetophenone, 1-hydroxyacetophenone, 1-hydroxycyclohexyl phenyl ketone, and 2-methyl-1-[4-(methylthio)phenyl]-2-morpholino-propane-1-one; anthraquinones such as 2-methylanthraquinone, 2-ethylanthraquinone, 2-tertiary-butylanthraquinone, 1-chloroanthraquinone, and 2-amylanthraquinone; thioxanthones such as 2,4-dimethylthioxanthone, 2,4-diethylthioxanthone, 2-chlorothioxanthone, and 2,4-diisopropylthioxanthone; ketals such as acetophenone dimethyl ketal and benzyldimethyl ketal; monoacylphosphine oxide such as 2,4,6-trimethylbenzoyl diphenylphosphine oxide or bisacylphosphine oxide; benzophenones such as benzophenone; and xanthones.

These photopolymerization initialtors can be used alone, or in combination with a photopolymerization promotor of the type of benzoic acid, amine, or the like.

The mixing ratio of the photopolymerization initiator is preferably between 0.1 part by weight and 10 parts by weight, both inclusive, and more preferably between 1 part by weight and 8 parts by weight, both inclusive, per 100 parts by weight of the composition.

Further, in the composition of the present invention, here can be mixed inactive components such as inorganic fillers, softening agents, oxidation inhibitors, antioxidants, stabilizers, tackifying resins, levelling agents, antifoaming agents, plasticizers, dyes, pigments, treating agents, and ultraviolet light screening agents in an amount of up to 100 parts by weight per 100 parts by weight of the total of the components (A), (B), and if required (C). Examples of the tackifying resins include rosins such as rosinic acid, polymeric rosinic acid, and rosinic acid ester, terpene resins, terpene phenol resins, aromatic hydrocarbon resins, aliphatic saturated hydrocarbon resins, and petroleum resins.

6. Manufacturing and Use Methods

The method for manufacturing the composition of the present invention has no particular restriction. The composition can be obtained by stirring or mixing the essential components of the present invention, and if required other components by a conventional method.

The adhesive composition of the present invention can be used for bonding of various base materials. Examples of the base material include plastics, paper, and metals.

The composition may be used in accordance with a commonly used method. There are included a method in which the composition is irradiated with active energy beams after being coated on the base material, and the like.

Examples of the active energy beams include ultraviolet rays, X rays, and electron beams. Out of these, ultraviolet rays are preferred because of the availability of an inexpensive apparatus. As a light source for curing with ultraviolet rays, various ones can be used. For example, there may be mentioned a pressurized or high pressure mercury lamp, a metal halide lamp, a xenon lamp, an electrodeless discharge lamp, and a carbon arc lamp. As an EB irradiation apparatus for curing by electron beams, various apparatuses can be used. Examples thereof include Cockroft-Walton type, van de Graaff type, and resonance type apparatuses, and the energy beams have an energy in a range of preferably 50 to 1000 eV, and more preferably 100 to 300 eV.

The adhesive composition of the present invention is preferably used for bonding sheets of thin layer adherend as base materials.

The adhesive composition may be used for bonding thin layer adherends in accordance with a commonly used method in manufacturing of a laminate. For example, mention may be made of the following method. Namely, the composition is coated on a first thin layer adherend, and if required, dried. Subsequently, a second thin layer adherend is bonded thereto by irradiation with an active energy beam. Here, at least one of the thin layer adherends is required to be a plastic film.

Examples of the thin layer adherend include a plastic film, paper, or metal foil. The plastic film is required to be an active energy beam-transmittable one. The film thickness may be selected according to the thin layer adherend to be used, and the use thereof, but is preferably 0.2 mm or less. Examples of plastics of the plastic film include polyvinyl chloride resin, polyvinylidene chloride, cellulosic resin, polyethylene, polypropylene, polystyrene, ABS resin, polyamide, polyester, polycarbonate, polyurethane, polyvinyl alcohol, ethylene-vinyl acetate copolymer, and chlorinated polypropylene. Examples of the paper include simili paper, woodfree paper, kraft paper, art coated paper, cast coat paper, machine glazed paper, parchment paper, waterproof paper, glassine paper, and corrugated fibreboard. Examples of the metal foil include aluminium foil.

Coating on the thin layer adherend may be accomplished by a conventionally known method. Examples thereof include the methods by means of a natural coater, knife belt coater, floating knife, knife over roll, knife on blanket, spraying, dipping, kiss-roll, squeeze roll, reverse roll, air blade, curtain flow coater, and gravure coater. The thickness of the composition of the present invention to be coated may be selected according to the thin layer adherend to be used and the use thereof, however, it is in a range of preferably 0.1 to 1000 $\mu$m, and more preferably 1 to 50 $\mu$m.

Since the laminated film or sheet obtained from the adhesive composition of the present invention is excellent in adhesive force under high temperature and high humidity conditions, it can be preferably used as an optical film such as a polarization film and a phase contrast film for use in a liquid crystal display apparatus and the like.

EXAMPLES

The present invention will be described in details by way of the following examples and comparative examples. It is noted that "part(s)" denotes "part(s) by weight" in each example.

Examples 1 to 4

The components (A), (B), and (C), and the photopolymerization initiator respectively described in Table 1 below were heated under agitation at 60° C. for 1 hour to be dissolved, thereby manufacturing each active energy beam-curable adhesive composition.

8) TPO: 2,4,6-trimethylbenzoyl diphenylphosphine oxide, Lucirine TPO (trade name), manufactured by BASF.

Each of the resulting compositions was evaluated in accordance with the following testing method. The results are shown in Table 2.

Testing Method (1) Manufacturing of Specimen

The resulting composition was coated in a thickness of 10 $\mu$m on a 75-$\mu$m-thick triacetyl cellulose (below, abbreviated as TAC) film by means of a bar coater.

Another 75-$\mu$m-thick TAC film was bonded thereto by means of a nip roll. Then, the laminate was allowed to repeatedly pass under a condensing metal halide lamp of 120 W/cm, under a condition of a conveyor speed of 5 m/min at a distance of 10 cm from the mercury lamp. Thus, the films were bonded to each other to manufacture a laminated film. The resulting laminated film was taken as a specimen A.

TABLE 1

| | Component (A) | | Component (B) | | Component (C) | | Photoinitiator | |
|---|---|---|---|---|---|---|---|---|
| Ex. | M1310[1] | UN 9200A[2] | B-1[3] | B-2[4] | M5700[5] | THFA[6] | Irg 184[7] | TPO[8] |
| 1 | 20 | | 80 | | | | 5 | |
| 2 | | 15 | | 85 | | | 5 | |
| 3 | 30 | | 30 | | | 40 | 5 | |
| 4 | | 25 | | 30 | 15 | 30 | | 2 |

In Table 1, each numeral denotes the number of parts, and abbreviation denotes as follows.

1) M1310: polyester based urethane acrylate, weight-average molecular weight of about 5,000, Aronix M1310 (trade name), manufactured by Toagosei Co., Ltd;
2) UN9200A: polycarbonate based urethane acrylate, weight-average molecular weight of about 20,000, Art-resin UN9200A (trade name) manufactured by Negami Chemical Industrial Co., Ltd;
3) B-1: imideacrylate represented by the following formula (6):

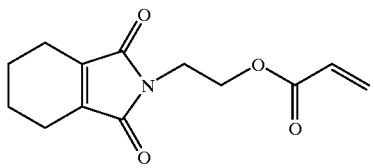

(6)

4) B-2: imide acrylate represented by the following formula (7):

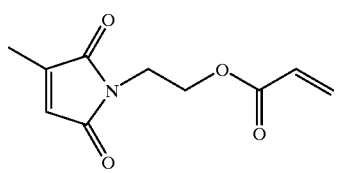

(7)

5) M5700: 2-hydroxy-3-phenoxypropyl acrylate, Aronix M5700 (trade name), manufactured by Toagosei Co., Ltd;
6) THFA: tetrahydrofurfuryl acrylate, Biscoat #190 (trade name), manufactured by Osaka Organic Chemical Industry Ltd;
7) Irg 184: 1-hydroxy-cyclohexyl-phenyl-ketone, Irugacure 184 (trade name), manufactured by Ciba Speciality Chemicals Corp; and A laminated film was manufactured in the same manner as in the foregoing, except that the TAC film was changed into a 50-$\mu$m-thick polycarbonate (below abbreviated as PC) film. The resulting laminated film was taken as a specimen B.

The resulting specimens were allowed to stand under the following conditions, and then evaluated for each peel strength and appearance.

Initial stage: at room temperature for 30 minutes;

High-temperature test: at 80° C. for 500 hours

High-humidity test: under the conditions of 60° C. and 90% RH for 500 hours.

(2) Peel Strength

Each specimen was subjected to the high-temperature test and the high-humidity test under the foregoing conditions, and then determined for its peel strength under the following conditions by means of a tensile testing machine.

Test piece: 25 mm×100 mm

Peel angle: 180 degrees

Peel rate: 200 mm/min

It is noted that the case where the base material is broken because of its sufficiently high adhesive strength during peel strength measurement is referred to as "matrix breaking".

(3) Appearance Observation

Each specimen was subjected to the high-temperature test and the high-humidity test under the foregoing conditions, and then visually evaluated for its appearance.

It is noted that the marks ○, Δ, and X in the table respectively indicate as follows.

○: no whitening, nor peeling, and thus good

Δ: whitening observed

X: whitening observed, and further peeling also observed

TABLE 2

| Ex | Specimen | Peel Strength (gf/inch) | | | Appearance observation | |
| | | Initial | After high-temperature test | After high-humidity test | After high-temperature test | After high-humidity test |
| --- | --- | --- | --- | --- | --- | --- |
| 1 | A | 1580 | 1470 | 1100 | ○ | ○ |
| 2 | A | Matrix breaking | Matrix breaking | 1210 | ○ | ○ |
| 3 | A | Matrix breaking | 1540 | 1440 | ○ | ○ |
|   | B | 1790 | 1910 | 1880 | ○ | ○ |
| 4 | A | Matrix breaking | Matrix breaking | 1560 | ○ | ○ |
|   | B | 1990 | 2020 | 1020 | ○ | ○ |

Comparative Examples 1 and 2

Active energy beam-curable adhesive compositions were respectively manufactured in the same manner as in the examples, except that imide acrylates B'-1 represented by the following formula (8) and B'-2 represented by the following formula (9), which are different from the component (B), were used, and the components and ratios described in Table 3 below were employed.

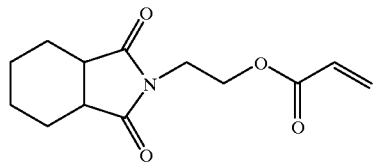

(8)

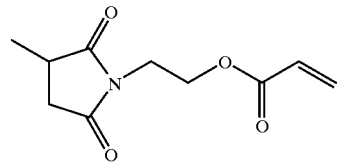

(9)

The resulting compositions were evaluated in the same manner as in Example 1. The results are shown in Table 4.

TABLE 3

| Comp. Ex. | Component (A) M1310 | Imide acrylate | | Component (C) | | Photoinitiator | |
| | | B'-1[9)] | B'-2[10)] | M5700 | THFA | Irg 184 | TPO |
| --- | --- | --- | --- | --- | --- | --- | --- |
| 1 | 20 | 80 |    |    |    | 5 |   |
| 2 | 20 |    | 30 | 20 | 30 | 5 | 2 |

In table 3, each numeral denotes the number of parts, and each abbreviation denotes the same meaning as in Table 1 except for the following ones.
9) B'-1: Imide acrylate represented by the above formula (8)
10) B'-2: Imide acrylate represented by the above formula (9)

TABLE 4

| Comp. Ex | Specimen | Peel Strength (gf/inch) | | | Appearance observation | |
| | | Initial | After high-temperature test | After high-humidity test | After high-temperature test | After high-humidity test |
| --- | --- | --- | --- | --- | --- | --- |
| 1 | A | Matrix breaking | Matrix breaking | 720 | ○ | ○ |
| 2 | A | Matrix breaking | 1100 | 630 | ○ | ○ |
|   | B | 1255 | 900 | 880 | ○ | ○ |

Comparative Examples 3 to 6

Active energy beam-curable adhesive compositions were manufactured in the same manner as in the examples, except that the components shown in Table 5 below were used.

The resulting compositions were evaluated in the same manner as in Example 1. The results are shown in Table 6.

TABLE 5

| Comp. Ex. | Component (A) M1310 | Component (A) UN 9200A | Component (B) B-1 | Component (B) B-2 | Imide acrylate B'-2 | Component (c) M5700 | Component (c) THFA | Component (c) ACMO[11] | Component (c) M101[12] | Photo-initiator Irg 184 |
|---|---|---|---|---|---|---|---|---|---|---|
| 3 | | | 80 | | | 20 | | | | 5 |
| 4 | 30 | | | | | 30 | | 40 | | 5 |
| 5 | | 25 | | | | 15 | 30 | | 30 | 5 |
| 6 | | | | | 100 | | | | | 5 |

In Table 5, each numeral denotes the number of parts, and each abbreviation denotes the same meaning as in Tables 1 and 2, except for the following ones.
11) ACMO: acryloylmorphorine, ACMO (trade name) manufactured by Kohjin Co., Ltd.
12) M101: phenoxyethoxy ethylacrylate, Aronix M101 (trade name), manufactured by Toagosei Co., Ltd.

TABLE 7

| Comp. Ex. | Urethane acrylate M1600[13] | Component (B) B-1 | Component (C) THEA | Photoinitiator Irg 184 |
|---|---|---|---|---|
| 7 | 30 | 30 | 40 | 5 |

In Table 7, each numeral denotes the number of parts, and each abbreviation denotes the same meaning as in Tables 1 and 2 except for the following one.

13) M1600: polyether based urethane acrylate, weight-average molecular weight of about 1,000, Aronix M1600 (trade name) manufactured by Toagosei Co., Ltd.

TABLE 6

| Comp. Ex. | Specimen | Peel Strength (gf/inch) Initial | Peel Strength (gf/inch) After high-temperature test | Peel Strength (gf/inch) After high-humidity test | Appearance observation After high-temperature test | Appearance observation After high-humidity test |
|---|---|---|---|---|---|---|
| 3 | A | 105 | 25 | 110 | x | ○ |
| 4 | A | Matrix breaking | 35 | 35 | ○ | Δ |
|   | B | 110 | 130 | 30 | ○ | x |
| 5 | A | 210 | 230 | 25 | ○ | x |
|   | B | 455 | 170 | 390 | ○ | ○ |
| 6 | A | Matrix breaking | 25 | 30 | x | ○ |

Comparative Example 7

An active energy beam-curable adhesive composition was manufactured in the same manner as in the examples, except that polyether based urethane acrylate shown in Table 7 below, which is different from the component (A), was used.

The resulting composition was evaluated in the same manner as in Example 1. The results are shown in Table 8.

TABLE 8

| Comp. Ex. | Specimen | Peel Strength (gf/inch) Initial | Peel Strength (gf/inch) After high-temperature test | Peel Strength (gf/inch) After high-humidity test | Appearance observation After high-temperature test | Appearance observation After high-humidity test |
|---|---|---|---|---|---|---|
| 7 | A | 100 | 110 | 40 | ○ | x |
|   | B | 1150 | 1010 | 100 | ○ | Δ |

According to the adhesive composition of the present invention, it is possible to maintain the excellent adhesive force even under high temperature and high humidity conditions. The adhesive composition of the present invention is effective for bonding thin layer adherends such as various plastic films. It can be preferably used in manufacturing of optical films for use in, particularly a liquid crystal display apparatus, or the like.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An active energy beam-curable adhesive composition, comprising:
   (A) urethane (meth)acrylate derived from polyester polyol or polycarbonate polyol;
   (B) a compound having at least one ethylenically unsaturated group together with at least one cyclic imide group represented by the following general formula (1):

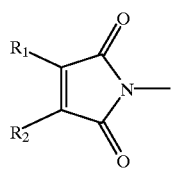
(1)

wherein $R_1$ and $R_2$ are each independently a hydrogen atom or an alkyl group having 4 or less carbon atoms, or $R_1$ and $R_2$ represent a saturated hydrocarbon group of a 5- or 6-membered ring formed by linkage with each other; and if required
   (C) a compound having at least one ethylenically unsaturated group other than said components (A) and (B).

2. The active energy beam-curable adhesive composition according to claim 1, wherein said component (B) is a compound represented by the following general formula (2):

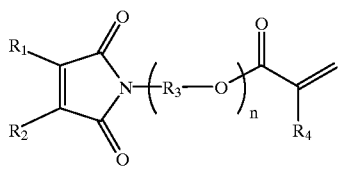
(2)

wherein $R_1$ and $R_2$ are each independently a hydrogen atom or an alkyl group having 4 or less carbon atoms, or $R_1$ and $R_2$ represent a saturated hydrocarbon group of a 5- or 6-membered ring formed by linkage with each other; $R_3$ represents a straight-chain or branched alkylene group having 1 to 6 carbon atoms; $R_4$ represents a hydrogen atom or a methyl group; and n denotes an integer of 1 to 6.

3. The active energy beam-curable adhesive composition according to claim 1 or 2, wherein the composition comprises said component (A) in an amount of 5 to 50% by weight, said component (B) in an amount of 10 to 95% by weight, and said component (C) in an amount of 0 to 85% by weight.

4. A method for producing a laminate comprising:
   coating an active energy beam-curable adhesive composition on a first thin layer adherend, and
   bonding a second thin layer adherend to said first adherend by irradiation with an active energy beam,
   said active energy beam-curable adhesive composition comprising:
   (A) urethane (meth)acrylate derived from polyester polyol or polycarbonate polyol;
   (B) a compound having at least one ethylenically unsaturated group together with at least one cyclic imide group represented group together with at least one cyclic imide group represented by the following general formula (1):

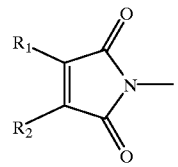
(1)

wherein $R_1$ and $R_2$ are each independently a hydrogen atom or an alkyl group having 4 or less carbon atoms, or $R_1$ and $R_2$ represent a saturated hydrocarbon group of a 5- or 6-membered ring formed by linkage with each other; and if required,
   (C) a compound having at least one ethylenically unsaturated group other than said components (A) and (B).

* * * * *